United States Patent

Seksaria et al.

[11] Patent Number: 6,056,349
[45] Date of Patent: May 2, 2000

[54] VEHICLE DOOR HAVING IMPROVED SIDE CRASH RESISTANCE AND ASSOCIATED METHOD

[75] Inventors: Dinesh C. Seksaria, Novi, Mich.; Rabindra K. Bhattacharyya, Export, Pa.

[73] Assignee: Aluminum Company of America, Pittsburgh, Pa.

[21] Appl. No.: 08/871,091

[22] Filed: Jun. 9, 1997

[51] Int. Cl.[7] ....................................................... B60J 5/00
[52] U.S. Cl. ..................................... 296/146.6; 296/146.5; 428/902; 442/6
[58] Field of Search ........................... 296/146.6, 146.5; 49/502, 63; 89/36.02, 36.04; 160/371, 264; 428/902; 442/6, 229

[56] References Cited

U.S. PATENT DOCUMENTS

| | | | |
|---|---|---|---|
| 1,810,438 | 6/1931 | Rado | 442/229 X |
| 1,870,400 | 9/1932 | Butterfass | 49/63 |
| 2,139,423 | 12/1938 | Scheeler | 160/371 |
| 2,349,907 | 5/1944 | Kos et al. | |
| 4,020,207 | 4/1977 | Alfter et al. | 428/138 |
| 4,092,453 | 5/1978 | Jonda | 428/902 X |
| 4,221,038 | 9/1980 | Singer et al. | 160/371 X |
| 4,290,235 | 9/1981 | Jahnle et al. | 49/502 |
| 4,316,404 | 2/1982 | Medlin | 296/146.6 X |
| 4,545,172 | 10/1985 | Wardill | |
| 4,590,121 | 5/1986 | Mahr | 428/902 X |
| 4,601,367 | 7/1986 | Bongers | |
| 4,750,779 | 6/1988 | Van Rooij | 296/146.6 X |
| 4,786,100 | 11/1988 | Kleemann et al. | |
| 4,915,442 | 4/1990 | Garnweidner | 296/146.6 X |
| 4,945,682 | 8/1990 | Altman et al. | 296/146.5 X |
| 4,969,680 | 11/1990 | Shimoda | |
| 5,141,279 | 8/1992 | Weller | |
| 5,169,204 | 12/1992 | Kelman | |
| 5,292,578 | 3/1994 | Kolzer | 428/902 X |
| 5,306,066 | 4/1994 | Saathoff | |
| 5,306,068 | 4/1994 | Nakae et al. | |
| 5,308,138 | 5/1994 | Hlavaty | |
| 5,538,781 | 7/1996 | Rao et al. | 428/902 X |
| 5,740,993 | 4/1998 | Siepe-Noll | 296/146.6 |
| 5,787,646 | 8/1998 | Nakoamori | 296/146.5 X |

Primary Examiner—D. Glenn Dayoan
Assistant Examiner—Patricia Engle
Attorney, Agent, or Firm—Arnold B. Silverman; Thomas R. Trempus

[57] ABSTRACT

A vehicle door has a door body which includes an outer door panel, an inner door panel, and a recess disposed therebetween. A metal mat has a plurality of elongated first elements and a plurality of second elements interwoven with respect to the first elements. The metal mat is secured directly or indirectly to the door body. The first elements are movable with respect to the second elements such that the application of an impact force thereto will result in relative sliding movement caused either by displacement of the first elements or second elements, or stretching of the same under the influence of the impact force, or both. In a preferred embodiment, peripheral portions of the woven mat are fixedly secured to a frame which is in turn secured to the door body. The first elements are preferably offset from the second elements about 50 to 100 degrees. In one embodiment a plurality of third elements oriented generally in the same direction as the second elements are interwoven with the first elements. An associated method is provided.

8 Claims, 4 Drawing Sheets

VEHICLE DOOR HAVING IMPROVED SIDE CRASH RESISTANCE AND ASSOCIATED METHOD

BACKGROUND OF THE INVENTION

1. Field of the Invention

The present invention relates to improved side crash energy management systems for vehicle doors and an associated method and, more specifically, it relates to such a system which employs a woven mat disposed in the interior of the vehicle door.

2. Description of the Prior Art

In recent years, increased attention has been directed toward the protection of occupants of automotive vehicles in the event of a collision. The use of seat belts, airbags and energy absorbing bumpers are examples of measures taken to minimize the risk of injury to vehicle occupants in the event of a collision.

In addition to seeking enhanced safety for vehicle occupants, it is also desirable to avoid reduction in interior passenger compartment volume within the vehicle. Also, it is desirable to avoid substantial increases in weight of the vehicle resulting from added safety devices, as such increases result in enhanced fuel consumption at a time when it is desirable to reduce fuel consumption.

In connection with protection of occupants of a vehicle in the event of side impact, reinforcement has been provided in vehicle doors.

It has been known to employ one or more elongated beam members referred to as a "door intrusion beam" in the interior of a vehicle door. These beams have been employed to absorb impact energy and, as a result, have been of relatively high strength and made of expensive materials. Also, in some instances, such systems thicken the doors which have occupied increased portions of the interior occupant space. Such beams tend to be rather heavy and are local in nature providing effective resistance only to the extent the side impact crash makes contact with the beam.

U.S. Pat. No. 4,545,172 discloses the use in a motor vehicle body panel a corrugated panel which is adapted to resist axially applied loads. See also U.S. Pat. No. 4,601,367 which discloses tubular, wound hollow members which are adapted to absorb axially applied loads. The use of a honeycomb material, which is positioned within the door interior to absorb energy in the event of a side collision, is disclosed in U.S. Pat. No. 5,306,066.

U.S. Pat. No. 5,141,279 discloses the use of a relatively small assembly exposed to the occupant compartment of a vehicle to protect the thorax region of an occupant. Various forms of cushioning and energy absorbing means, including hollow members, the use of open-celled foam, springs, and hydraulic fluid, are disclosed.

It has been known to suggest the use of pairs of corrugated panels in reinforcing vehicle doors. See U.S. Pat. No. 4,969,680.

U.S. Pat. No. 4,786,100 discloses the use of deformable plates having upstanding elements which absorb energy by fracturing in order to protect an occupant. U.S. Pat. No. 5,306,068 discloses various forms of shock absorbing members, including the use of foam resin tubes within a door oriented generally transversely with respect to the front to back axis of the vehicle, and the use of a plurality of undulating sheets between plate members within doors, as well as certain vehicle bumper protection.

U.S. Pat. No. 5,169,204 discloses the use of viscous dampening of impact energy by the use of a gel or liquid in connection with a vehicle door system.

U.S. Pat. No. 5,308,138 discloses the use of beam-like reinforcing members having a pair of web connected tubular portions.

U.S. Pat. No. 2,349,907 discloses a unitary expanded metal mesh structure having diamond-like openings to absorb energy in a car door. The expanded metal is said to provide a stiffening of the panel which prevents flexing thereof.

It will be appreciated, therefore, that there remains a real and substantial need for an energy absorbing vehicle door which will effectively absorb side impact forces in a manner which not only provides enhanced vehicle occupant safety, but also is consistent with other objectives of vehicle design and construction.

SUMMARY OF THE INVENTION

The present invention has met the above-described need by providing improved energy absorbing constructions for vehicle doors and vehicle side panels.

The vehicle door of the present invention has an outer panel, an inner door panel and a recess disposed therebetween. A mat has a plurality of elongated first elements and a plurality of elongated second elements interwoven with respect to each other and securing means for directly or indirectly securing the mat to the door body. The first elements preferably may move with respect to the second elements such that side impact will cause bending and stretching of the mat first and second elements and also relative movement therebetween. In one embodiment, the orientation of the first elements will be about 50 to 100 degrees and preferably about 85 to 100 degrees offset with respect to the orientation of the second elements.

A frame member is preferably continuously peripherally secured to the mat such that impact on any portion of the mat will result in the impact forces being transferred to the frame. The frame is preferably secured to the door body.

The mat preferably has an area which is at least about 65 to 85 percent of the area of the door body which is disposed at a level under the window sill of said door. An associated method provides for introduction of such a mat into the door body recess and securing the same directly or indirectly to the door body.

It is an object of the present invention to provide an energy absorbing woven mat within a vehicle door so as to resist impact forces applied to the vehicle from the side and an associated method of constructing such a door.

It is a further object of this invention to provide such a system which in one embodiment employs a high-strength woven metal mat which protects against impact over greater areas than the prior art beam or beams, and effectively transmits the impact force load to the door body.

It is a further object of the invention to provide such a system wherein impact forces are effectively dampened substantially independent of the specific location on the door where the impact occurs.

It is a further object of the present invention to provide such a system which effectively manages crash energy, while not adding substantial weight to the vehicle or requiring a reduction of space within the vehicle's occupant compartment.

It is a further object of the present invention to provide a vehicle door which distributes impact loads throughout the door frame so as to resist undesired door frame or door deformation and thereby enhance the likelihood that the door will open after impact.

It is a further object of the present system to provide a metal woven mat which has substantially the entire mat participating in the absorption of impact energy and not merely the location where the impact has occurred.

It is a further object of the present invention to provide a lightweight intrusion barrier resisting out of plane deformation of a vehicle door.

These and other objects of the invention will be more fully understood from the following description of the invention on reference to the illustrations appended hereto.

DESCRIPTION OF THE PREFERRED EMBODIMENTS

As employed herein the term "vehicle" means a vehicle powered by an internal combustion engine or a battery or another source of electrical energy, and having pneumatic tires. The term "vehicle" shall expressly include, but not be limited to, automobiles, vans, trucks, truck tractors, buses and station wagons.

As employed herein the term "vehicle door" means (a) a side door of a vehicle or (b) a fixed side panel of a vehicle disposed adjacent to the passenger compartment of the vehicle and shall include, but not be limited to, the panels disposed adjacent to the rear seat of a two door automobile.

The term "mat" as employed herein shall mean a woven mat having openings therethrough and including an assembly of a plurality of elongated first elements and a plurality of elongated second elements angularly offset from each other. The term "mat" shall also include such woven structures having additional elongated elements interwoven with the mat.

As employed herein the term "mat area" shall refer to the area covered by the mat without deducting for openings in the mat and shall be determined by the periphery of the mat or, in the event the periphery of the mat is secured to a frame, the inner frame dimensions.

Figure 1:
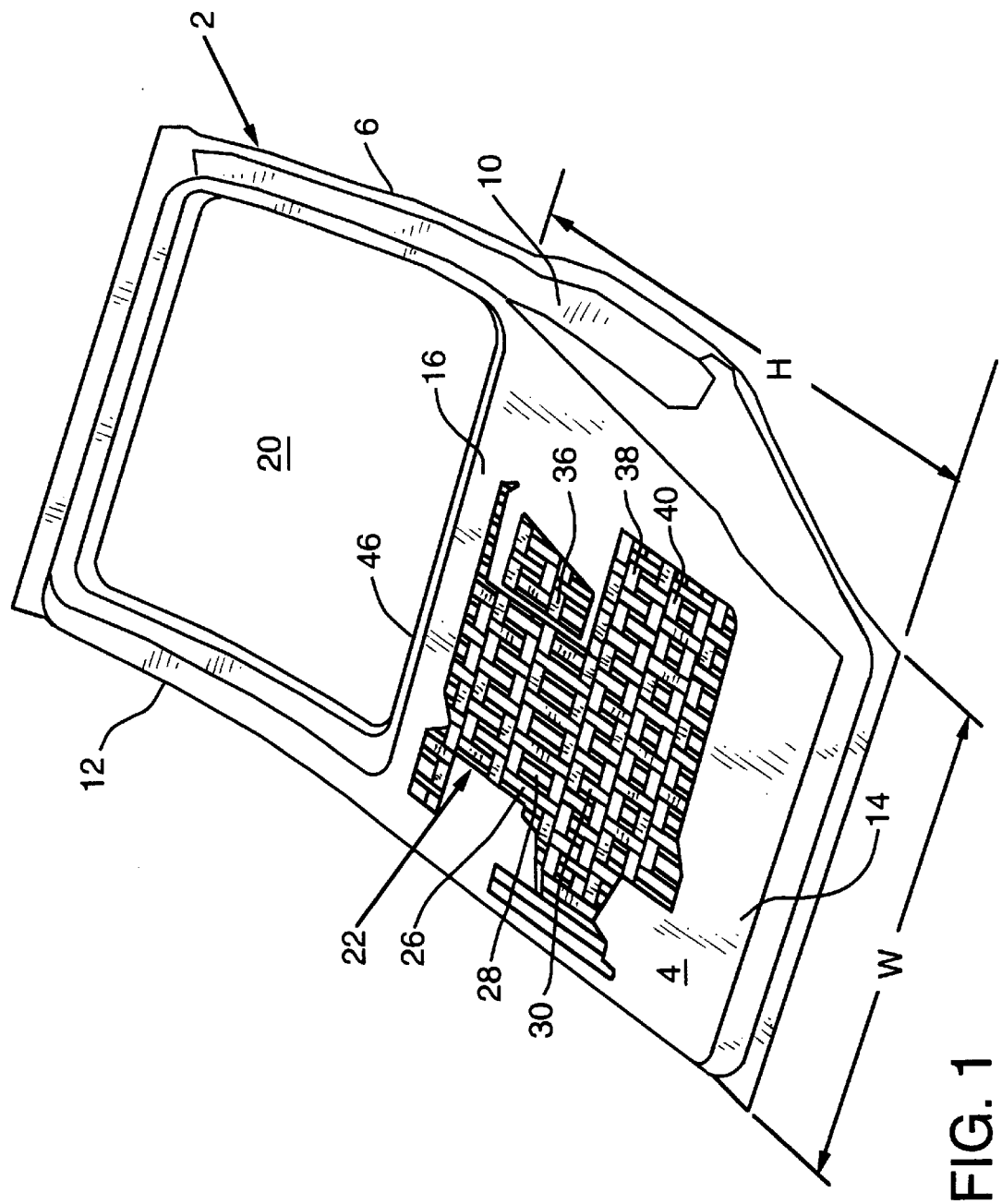
FIG. 1 is a perspective, partially schematic, partially broken away view of a vehicle door employing a mat of the present invention.

Referring again to FIG. 1, there is shown a door body 2 which for clarity of illustration has been shown without details such as the internal hardware of the door, controls to operate windows, power seats, door speakers, window glass, door handle and other conventional components well known to those skilled in the art. The door has an inner door panel 4, and outer door panel 6, the edge of which is shown in FIG. 1 crimped to the hinge side portion and lower beam of the door frame 2. The outer door panel 6 preferably will be crimped continuously around the entire door frame 10. The door also has a latch end frame (not shown) component positioned at 12, a lower beam (not shown) positioned at 14, and a belt line reinforcement beam (not shown) positioned at 16. A window opening 20 is defined within the upper door portion.

A woven mat 22 is oriented generally parallel to said outer door panel 6. The mat 22 has a plurality of elongated first elements 26, 28, 30, for example, interwoven with a plurality of elongated second elements 36, 38, 40, for example. In the preferred embodiment of the invention, the orientation of the first elements 26, 28, 30, with respect to the second elements 36, 38, 40, will preferably have a relative offset of about 85 to 95 degrees and, more generally, the offset may be 50 to 100 degrees. It is preferred that the mat elements be freely movable with respect to each other except at the peripheral restraint regions which will be discussed hereinafter. As a result, an out of plane impact applied to the exterior of the door 2 will result in inward deformation of the mat through bending, stretching and relative movement of the individual elements.

For convenience of reference herein, the region of the door 2, which will be protected by the woven mat of the present invention, will be considered to be within the area underlying the window sill 46 and will have a height H and a width W. In general, it will be preferred that the woven mat area be about 65 to 85 percent of the area of this portion of the door which latter area is determined by multiplying H by W.

The elongated first elements and elongated second elements are preferably made from a metal of suitable strength, such as aluminum in wire, bar, rod or strip form. An example of suitable materials are those of the 6XXX or 7XXX series, preferably in temper T6. These elements may also be made of resinous polymers, such as the material sold under the trade designation KEVLAR or fiber reinforced tapes, for example.

In the form shown in FIG. 1, the elongated first elements 26, 28, 30 are oriented generally perpendicularly with respect to elongated second elements 36, 38, 40. In addition to altering the angle between the elongated first elements 26, 28, 30 and elongated second elements 36, 38, 40 as discussed herein, the elongated first elements 26, 28, 30 need not be generally perpendicular to the window sill 46 and elongated second elements need not be generally parallel to the window sill 46. If desired, the elongated elements may, with or without altering the angle between elongated first elements 26, 28, and elongated second elements 36, 38, 40, be positioned angularly offset from the positions shown in FIG. 1. For example, while retaining the perpendicular relationship between the elongated first elements 26, 28, 30 and elongated second elements 36, 38, 40, the mat may be positioned 45 degrees offset in either angular direction from the illustrated position.

Figure 2:
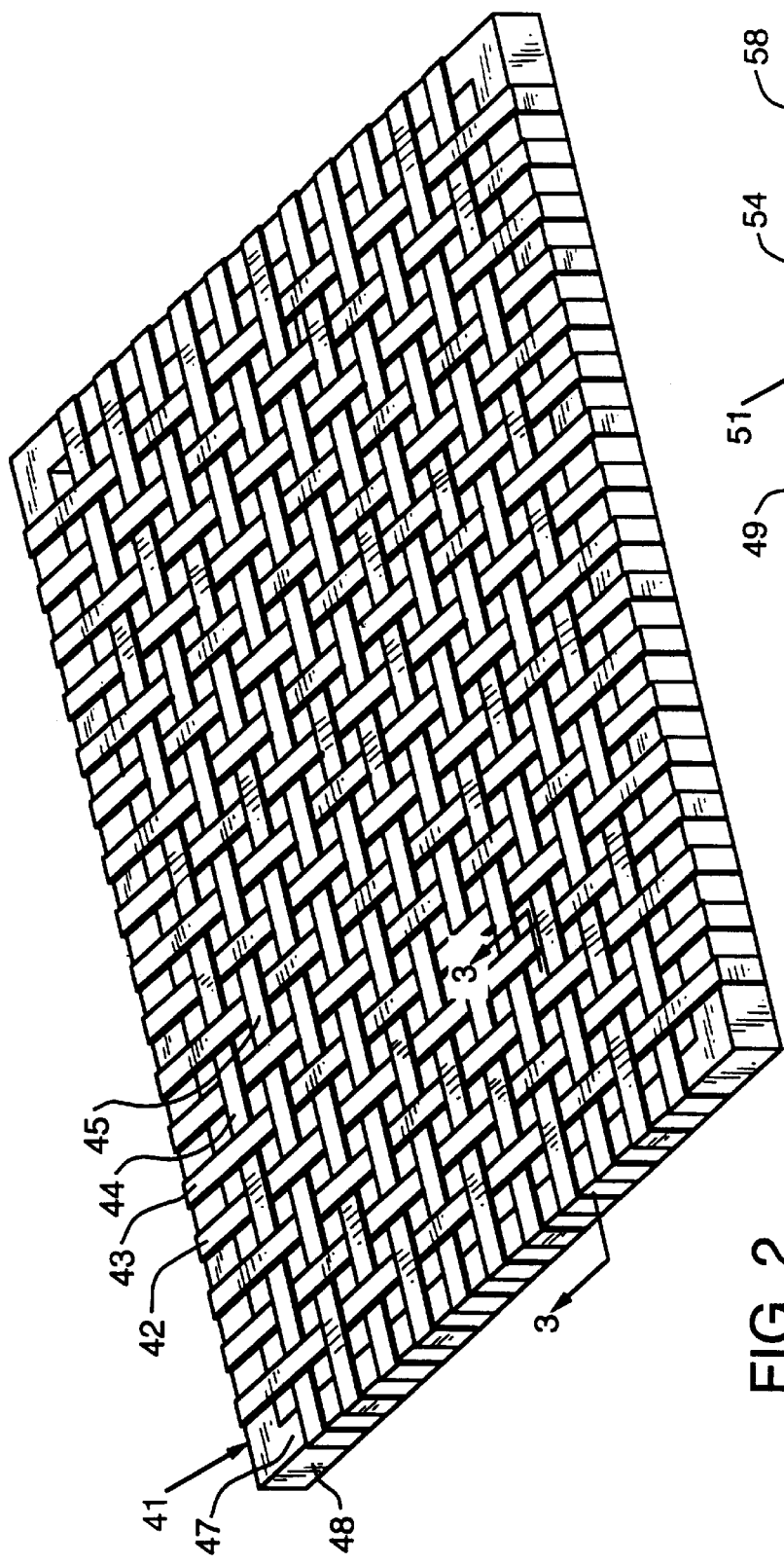
FIG. 2 is a perspective view of one embodiment of a mat of the present invention secured to a frame.
Figure 3:
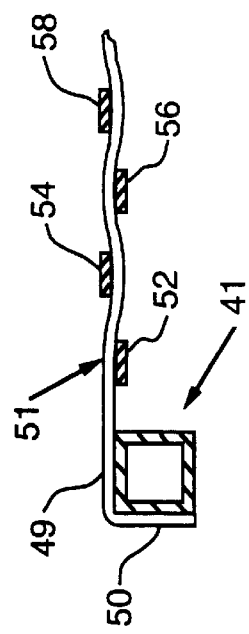
FIG. 3 is a cross-sectional illustration showing a portion of the mat and frame of FIG. 2 taken through 3—3 of FIG. 2.

Referring to FIGS. 2 and 3 there is shown a first embodiment of a woven mat of the present invention usable in connection with reinforcing vehicle doors against side impact. The mat has a plurality of elongated first strap elements such as 42, 43, for example, which are oriented generally parallel to each other. In the form shown, the elongated first elements 42, 43 are of generally rectangular cross-sectional configuration, but it will be appreciated that they could also be of circular configuration. A plurality of elongated second strap elements, such as 44, 45, for example, are interwoven with the elongated first elements 42, 43 and, in the form shown, are generally ribbon-like in configuration. The first elements 42, 43 are woven with respect to each other. As shown in FIGS. 2 and 3, a frame 41 is composed of a tubular closed member having an upper surface 47 and a lateral surface 48 and may be made of metal or a polymer material. Strap 51 has portions 49 and 50 secured to frame surfaces 49, 50 by any suitable means including adhesives, welding, hook and loop fasteners, such as VELCRO, or mechanical fasteners, for example. Strap 51 is shown woven with straps 52, 54, 56, 58.

The spacing between adjacent parallel straps may be evenly spaced or may have some adjacent parallel straps spaced differently from the spacing between other pairs of adjacent straps. In general, by way of example, the elongated first and second strap elements 42, 43, 44, 45 may have a width of about 0.12 to 0.36 inch and a thickness of 0.04 to 0.06 inch.

In the preferred embodiment of the invention, the woven mat of FIGS. 2 and 3 will be secured to a closed frame 41 which, in the form shown, is rectangular, but may assume any desired configuration corresponding to the size and shape of the region within a vehicle door which is to be protected.

The frame 41 is in turn secured to the edge of the outer door panel by crimping, or by other suitable means. In a preferred embodiment the edge will be crimped continuously about the full circumference of the frame.

It is preferred that the elongated first elements 42, 43 not be secured to the elongated second elements 44, 45 apart from their peripheral securement to frame 41. As a result, a side impact, which may be delivered generally perpendicular to the mat, will result in the mat moving inwardly under the influence of the impact force. The adjacent interwoven elements are responsively subjected to a relative sliding movement to create friction which in part dissipates the impact energy, as well as absorbing the impact energy through the bending of the first and second elongated metal elements, and stretching of said elements. Also, it will be appreciated that the restraint provided by the frame 41 and outer door panel results in side impact anywhere on the mat being partially dissipated by the mat and partially transferred to the door body. Unlike prior art use of a beam or more than one beam, with impact on a beam resulting in full application of the load to the beam which is subjected to the impact, impact on the woven mat of the present invention results in the load being distributed throughout the mat and to the supporting structure of the door body directly or indirectly.

Figure 4:
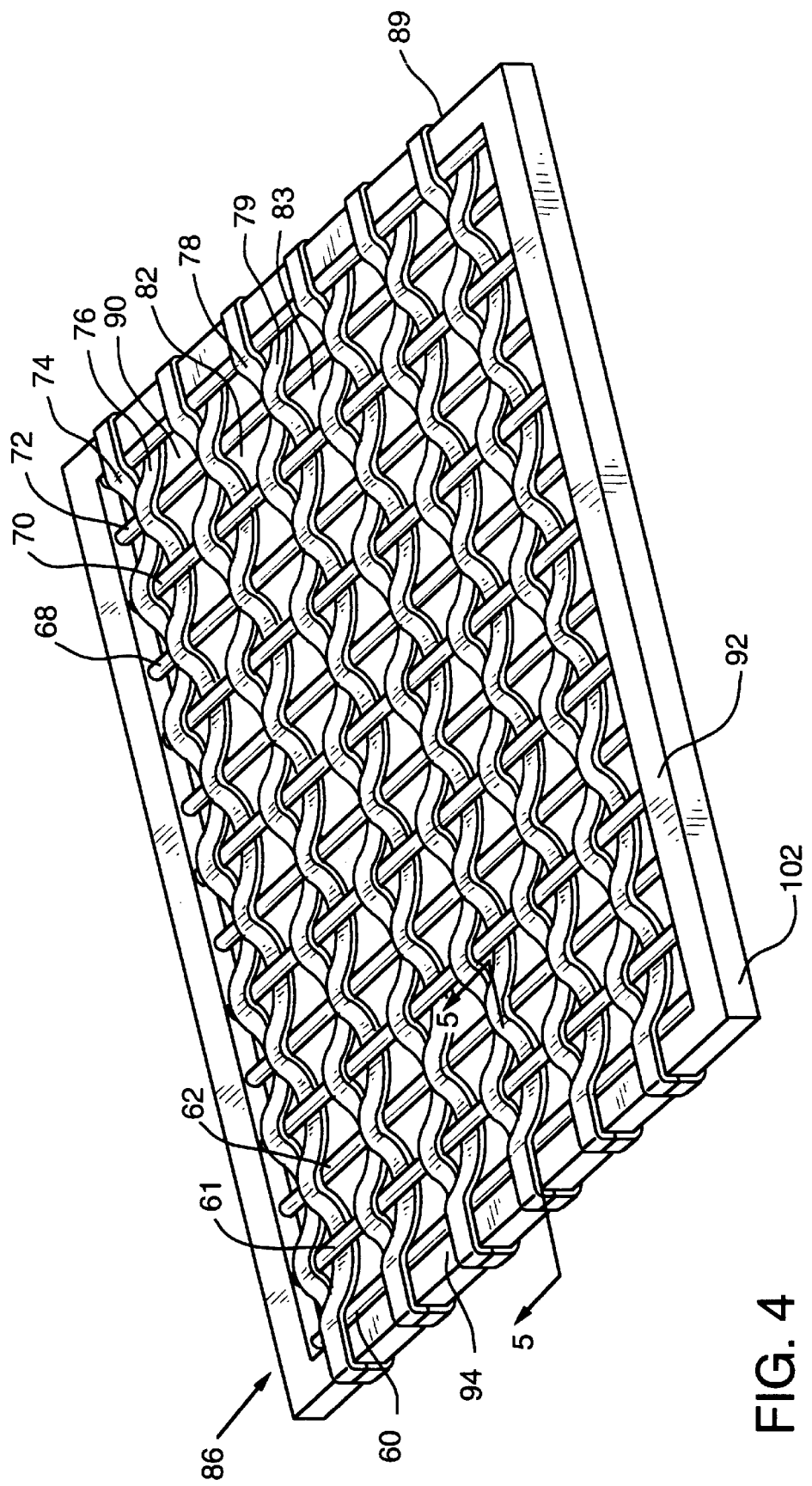
FIG. 4 is a perspective view showing a mat and frame of the present invention with a different embodiment of mat.
Figure 5:
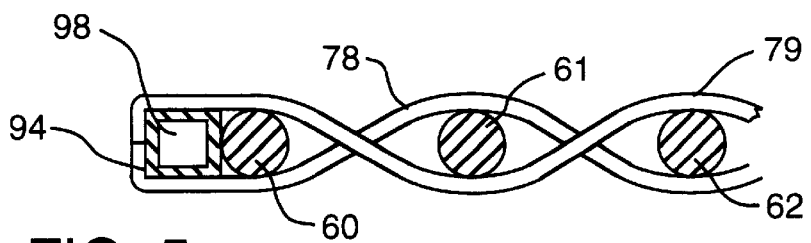
FIG. 5 is a cross-sectional illustration of a portion of the mat of FIG. 4 taken through 5—5 of FIG. 4.

Referring to FIGS. 4 and 5, a plurality of elongated generally parallel first strap elements 74, 76, 78, 79 are interwoven with a plurality of elongated parallel cylindrical rods 60, 61, 62, 68, 70 with alternate first strap elements staggered in the weave pattern shown. Openings, such as 82, 83, 90, are provided in the mat. Frame 86 is tubular and generally rectangular with first straps looped over end frame members 89, 94. FIG. 5 shows the hollow bore 98 of end member 94.

Figure 6:
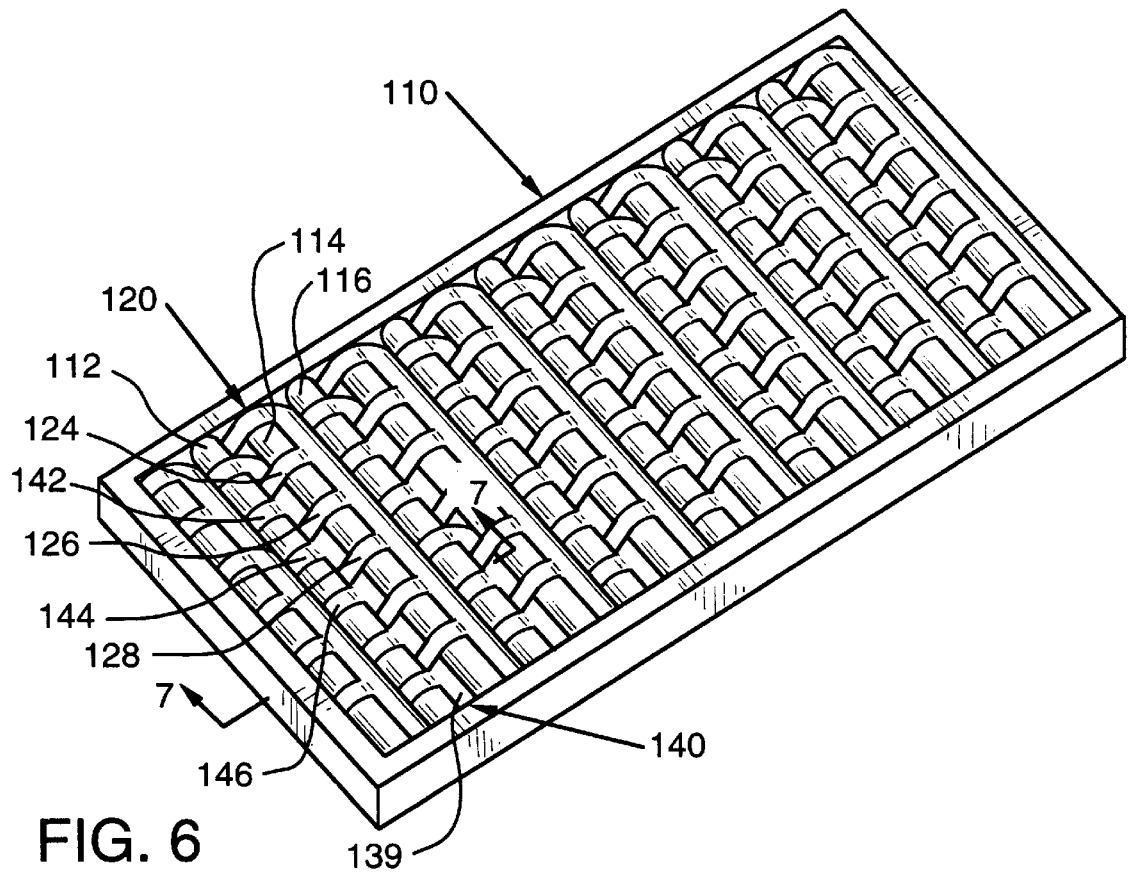
FIG. 6 is a perspective view of another form of mat of the present invention secured to a frame.
Figure 7:
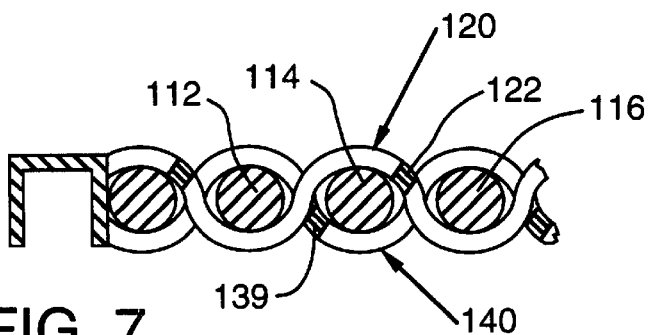
FIG. 7 is a cross-sectional illustration of a portion of the mat taken through 7—7 of FIG. 6.

Referring to FIGS. 6 and 7, a further embodiment of the present invention will be considered. In this embodiment elongated third elements are employed, in addition to first and second elements. A frame 110 is of generally rectangular configuration and has a plurality of elongated metal first elements 112, 114, 116, for example, along with a plurality of elongated second elements 120 which have a connecting header member 122 secured to a plurality of undulating elements 124, 126, 128, for example. The undulating elements 124, 126, 128 progressively pass under and over successive first elongated first elements 112, 114, 116 at locations axially spaced along said elements. Similarly, elongated third elements 140 have a header 139 and a plurality of undulating elements 142, 144, 146 which also alternately go over and under the elongated first elements in a sequence which is out of phase with respect to elongated second elements. As a result, the elongated third elements 140 are oriented generally the same as the elongated second elements, but are out of phase with respect thereto. As shown in FIG. 7 in this embodiment, the frame is generally channel shaped and has a downwardly open recess. The mat may be secured to the frame in any desired manner.

The method of the present invention includes providing a vehicle door body having an outer door panel, an inner door panel, and a recess disposed therebetween. A mat in one embodiment having a plurality of elongated first elements and a plurality of elongated second elements interwoven with and offset from the first elements is secured within the door recess such that impact forces applied to the door from the side will result in the force being dissipated by larger regions of the mat than the portion thereof to which the impact is applied and the force being transferred to the door body.

While for convenience of reference herein specific reference has been made to the use of metal, such as aluminum, in the elongated mat elements, which comprise the elements which are interwoven in creating the mat and in the frame, the invention is not so limited. For example, high tensile strength steel elements, polymeric materials, such as that sold under the trade designation "Kevlar," aramid fibers, fiberglass, fiber reinforced plastic or fabric straps of suitable strength could be employed.

While in a preferred embodiment of the invention the mat has its periphery secured to a frame which in turn is secured to the door body, if desired, the mat may be secured directly to the door body. Reference herein to the mat being secured to the door body or a portion thereof shall include direct or indirect securement.

It will be appreciated that in the preferred embodiment of the invention adjacent interwoven elements are not physically secured to each other except where securement is effected to a frame or door body. This permits the desired relative sliding movement, bending, stretching, and force transfer to the frame and door member directly or indirectly. It will be appreciated, therefore, that the door construction and method of the present invention provides an efficient means of absorbing impact energy resulting from side collision with a vehicle door in a manner which does use more interior space in the passenger compartment of the vehicle or add large weight to the vehicle. All of this is accomplished with a woven mat which is mounted within the door interior, while not interfering with the space for or operation of normal door accessories, such as locking devices, window operating devices, handles, mirror controls and other conventional elements associated with vehicle doors.

Whereas particular embodiments of the invention have been described herein for purposes of illustration, it will be evident to those skilled in the art that numerous variations of the details may be made without departing from the invention as defined in the appended claims.

What is claimed is:

1. A vehicle door comprising, said vehicle door having a window with a window sill, a door body having an outer door panel, an inner door panel and a recess disposed therebetween, a metal mat having a plurality of elongated first elements and a plurality of elongated second elements interwoven with respect to said first elements, said metal mat being fixedly secured to said door body at a level below said window, at least some of said elements having a cross-sectional configuration which is selected from the group consisting of circular and rectangular, and said second elements being ribbon-like, whereby an out of plane impact force applied to said metal mat will cause said mat to yield through relative movement of said first elements with respect to said second elements.

2. The vehicle door of claim 1 including said first elements extending in a direction which is about 50 to 100 degrees with respect to the direction in which said second elements extend.

3. The vehicle door of claim 1 including said first elements extending in a direction which is about 85 to 100 degrees offset from the direction in which said second elements extend.

4. The vehicle door of claim 1 including said mat having a mat area of about 65 to 85 percent of the area of said door disposed below the window sill thereof.

5. The vehicle door of claim 1 including said vehicle door being an automobile vehicle door.

6. The vehicle door of claim 13 including a plurality of elongated third metal elements interwoven with said first elements and being oriented in generally the same direction as said second elements.

7. The vehicle door of claim 10 including said second elements being interwoven with said first elements in a first alternating pattern, and third elements being interwoven with first elements in a second alternating pattern which is staggered with respect to the pattern of said second elements.

8. The vehicle door of claim 1 including said first elements being slidingly movable with respect to said second elements.

* * * * *

UNITED STATES PATENT AND TRADEMARK OFFICE
CERTIFICATE OF CORRECTION

PATENT NO. : 6,056,349
DATED : May 2, 2000
INVENTOR(S) : Seksaria et al.

It is certified that error appears in the above-identified patent and that said Letters Patent is hereby corrected as shown below:

Column 8, claim 6,
Line 6, after claim, delete "13" and insert -- 1 --.

Column 8, claim 7,
Line 10, after claim, delete "10" and insert -- 6 --.

Signed and Sealed this

Eighteenth Day of September, 2001

*Attest:*

Nicholas P. Godici

NICHOLAS P. GODICI
*Attesting Officer*   *Acting Director of the United States Patent and Trademark Office*